United States Patent
Gasafi et al.

(10) Patent No.: US 8,523,998 B2
(45) Date of Patent: Sep. 3, 2013

(54) PROCESS FOR PRODUCING GEOPOLYMERS

(75) Inventors: Edgar Gasafi, Karlsruhe (DE); Katja Dombrowski-Daube, Brand-Erbisdorf (DE)

(73) Assignee: Outotec Oyj, Espoo (FI)

( * ) Notice: Subject to any disclaimer, the term of this patent is extended or adjusted under 35 U.S.C. 154(b) by 0 days.

(21) Appl. No.: 13/516,240

(22) PCT Filed: Nov. 9, 2010

(86) PCT No.: PCT/EP2010/006807
§ 371 (c)(1), (2), (4) Date: Jun. 15, 2012

(87) PCT Pub. No.: WO2011/072777
PCT Pub. Date: Jun. 23, 2011

(65) Prior Publication Data
US 2012/0255462 A1 Oct. 11, 2012

(30) Foreign Application Priority Data
Dec. 16, 2009 (DE) .................. 10 2009 058 429

(51) Int. Cl.
C04B 7/36 (2006.01)
(52) U.S. Cl.
USPC .......................... 106/692; 106/745
(58) Field of Classification Search
USPC ..................................... 106/692, 745
See application file for complete search history.

(56) References Cited

U.S. PATENT DOCUMENTS

| | | | |
|---|---|---|---|
| 4,472,199 A | 9/1984 | Davidovits | |
| 4,509,985 A | 4/1985 | Davidovits et al. | |
| 5,342,595 A | 8/1994 | Davidovits et al. | |
| 5,539,140 A * | 7/1996 | Davidovits | 588/3 |
| 6,221,148 B1 * | 4/2001 | Mathur et al. | 106/484 |
| 6,635,316 B1 | 10/2003 | Muller et al. | |
| 2008/0145610 A1 | 6/2008 | Muller et al. | |

FOREIGN PATENT DOCUMENTS

| | | |
|---|---|---|
| CN | 101445348 A | 6/2009 |
| CN | 101492263 A | 7/2009 |
| DE | 3416537 A1 | 11/1984 |
| DE | 69105958 T2 | 8/1995 |

(Continued)

OTHER PUBLICATIONS

CN 101492263 A (Jul. 29, 2009) Bao et al., Fushun Mining Group Co LTD. (abstract only).*

(Continued)

Primary Examiner — Paul Marcantoni
(74) Attorney, Agent, or Firm — Leydig, Voit & Mayer, Ltd.

(57) ABSTRACT

A process for producing a geopolymer includes combusting at least one of oil shale and mineral residues originating from a production of oil using the oil shale so as to produce a combustion product. The combustion product is ground. An alkaline activator is added to the combustion product to form a geopolymer mixture. Water is added to the geopolymer mixture. The geopolymer mixture is adjusted so as to obtain a mol ratio of Si:Al of 2 to 5, a mol ratio of K:Al of 0.6 to 0.7, a mol ratio of Si:K of 3 to 10, a mol ratio of Ca:Al of 0.1 to 0.4, and a mol ratio of Si:CA of 4.9 to 41. The geopolymer mixture is hardened.

13 Claims, 1 Drawing Sheet

(56) References Cited

FOREIGN PATENT DOCUMENTS

| | | | |
|---|---|---|---|
| DE | 19915093 A1 | 10/2000 | |
| EP | 0087689 A1 | 9/1983 | |
| EP | 1236702 A1 | 9/2002 | |
| EP | 0727398 B2 | 10/2002 | |
| EP | 1632341 B1 | 3/2006 | |
| GB | 2140793 A | 12/1984 | |

OTHER PUBLICATIONS

European Patent Office, International Search Report in International Patent Application No. PCT/EP2010/006807 (Jan. 28, 2011).

Duxson, P., et al. (XP-002615948), The Role of Inorganic polymer technology in the development of 'green concrete,', Cement and Concrete Research, vol. 37, No. 12, Dec. 1, 2007, pp. 1590-1597.

Skvara, F. (XP-002615949), Alkalo activated materials or geopolymets?, Ceramics—Silikaty, vol. 51, Mar. 1, 2007, pp. 173-177.

XP-002615950 Abstract, Database WPI, Week 200942, Thomson Scientific, London, GB, AN 2009-K30129 and CN 101 445 348 A (Univ. Qinghua), Jun. 3, 2009.

XP-002615951 Abstract, Database WPI, Week 200953, Thomson Scientific, London, GB, AN 2009-M35654 and CN 101 492 263 A (Fushun Mining Group Co. Ltd.), Jul. 29, 2009.

\* cited by examiner

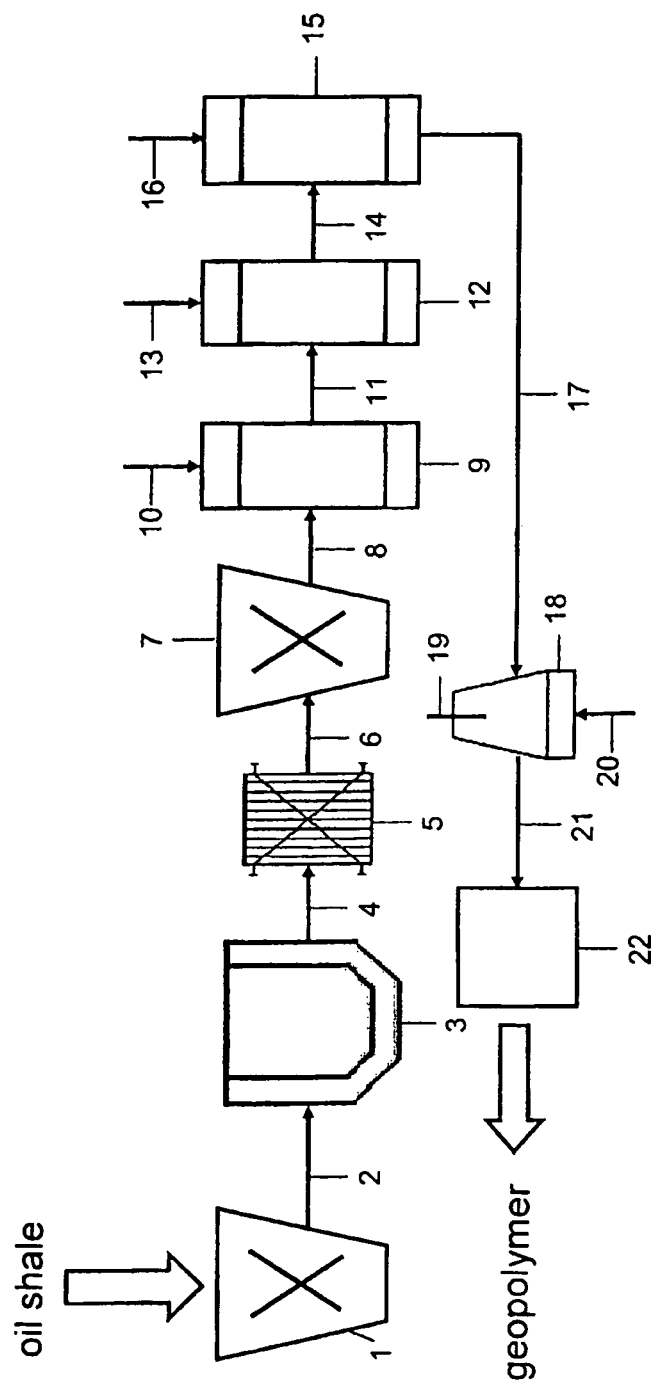

PROCESS FOR PRODUCING GEOPOLYMERS

CROSS-REFERENCE TO PRIOR APPLICATIONS

This application is a U.S. National Phase application under 35 U.S.C. §371 of International Application No. PCT/EP2010/006807, filed on Nov. 9, 2010, and claims benefit to German Patent Application No. DE 10 2009 058 429.3, filed on Dec. 16, 2009. The International Application was published in English on Jun. 23, 2011 as WO 2011/0072777 under PCT Article 21(2).

FIELD

The present invention relates to a process for producing geopolymers from oil shale and/or mineral residues, which originate from the production of oil by means of oil shale.

BACKGROUND

Geopolymers are inorganic aluminosilicate polymers, which are obtained by polycondensation at high pH values and low temperatures (room temperature). By means of an alkaline medium, $Si(OH)_4$ and $[Al(OH)_4]$ monomers or also oligomers initially are released from the solid material. Subsequently, solidification is effected by polycondensation, whereby an aluminosilicate polymer network is formed. This network consists of $SiO_4$ and $AlO_4$ tetrahedrons, which each are linked with other tetrahedrons via four corners.

Geopolymers can be used as binder in the construction material industry, in order to decrease the cement content or ensure faster hardening. Further advantages of geopolymers include the chemical resistance, temperature resistance, high final strength, high density and low permeability.

A multitude of solids such as metakaolin or also fly ash can be used as educts. The use of geopolymers as an alternative binder for concrete opens up the possibility of a new construction material. Its potential chiefly consists in the fact that during the production of classical cements, such as Portland cement, major amounts of the greenhouse gas carbon dioxide are released by the reaction:

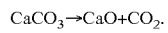

$$CaCO_3 \rightarrow CaO + CO_2.$$

Geopolymers thus represent an alternative binder, which decrease the $CO_2$ emission and counteract the greenhouse effect.

Since the properties of geopolymers depend on their composition, different geopolymers are produced in practice depending on the requirements profile.

U.S. Pat. No. 4,472,199 for example describes a geopolymer from the silicoalumina family with the following composition: Potassium oxide to silicon oxide 0.3 to 0.38, silicon oxide to alumina 4.0 to 4.2, water to alumina 14 to 20, and potassium oxide to alumina 1.3 to 1.52. The geopolymer thus obtained shows a distinctly pronounced structure, which has ion exchange properties and accordingly can be used in a similar way as zeolites or molecular sieves.

From U.S. Pat. No. 4,509,985 however a polymer is known, which has the following compositions: $M_2O$ to silica 0.2 to 0.36, silica to alumina 3 to 4.12, water to $M_2O$ 12 to 20, and $M_2O$ to alumina 0.6 to 1.35, wherein the letter M can be representative for a member of the group including sodium oxide, potassium oxide or a mixture of sodium oxide and potassium oxide. The solid material thus produced is characterized by a particular early high strength.

While in these two documents the polymer is produced from a mixture of different silicates by adding an alkaline activator and water while stirring continuously and at a slightly elevated temperature, DE 691 05 958 T2 describes a process for producing an aluminosilicate geopolymer in which silicon dusts are used. These silicon dusts are obtained by condensation of silicon oxide vapors from the electrofusion at very high temperatures and have an amorphous structure.

All documents have in common that minerals with a defined composition are used as educts.

SUMMARY

In an embodiment, the present invention provides a process for producing a geopolymer. The process includes combusting at least one of oil shale and mineral residues originating from a production of oil using the oil shale so as to produce a combustion product. The combustion product is ground. An alkaline activator is added to the combustion product to form a geopolymer mixture. Water is added to the geopolymer mixture. The geopolymer mixture is adjusted so as to obtain a mol ratio of Si:Al of 2 to 5, a mol ratio of K:Al of 0.6 to 0.7, a mol ratio of Si:K of 3 to 10, a mol ratio of Ca:Al of 0.1 to 0.4, and a mol ratio of Si:CA of 4.9 to 41. The geopolymer mixture is hardened.

BRIEF DESCRIPTION OF THE DRAWING

The present invention will be described in even greater detail below based on the exemplary FIGURE. The invention is not limited to the exemplary embodiment. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 schematically shows a plant for performing the process in accordance with an embodiment of the invention.

DETAILED DESCRIPTION

For further improvement of the ecobalance, the present invention recognizes it to be expedient to use a substance obtained as waste product of another process. Such substance, in an embodiment, is oil shale.

Oil shales are rocks containing bitumen and/or low-volatility oils, wherein the amount of bound organic components can be between 10 and 30% depending on the deposit. Oil shale is particularly useful as energy source and has a calorific value between 4 and 8 megajoule per kilogram, based on the raw substance.

Accordingly, in an embodiment, the present invention uses the residues left during the combustion of oil shale for the production of geopolymers.

In an embodiment, the present invention provides that the oil shale and/or also mineral residues, which originate from the production of oil by means of shale are burnt and subsequently ground, before they are mixed with an alkaline activator and water and cured. During use of the oil shale calcining residue in accordance with an embodiment of the invention, the oil shale calcining residue acts both as mineral component and as activator. The effect as activator is caused by calcium oxide, which must be formed during production of the calcining residue. In contrast to previous practice, a rather complete decarbonation of the calcium carbonate contained in the crude oil shale is desired in calcining processes, in order to maximize the yield of calcium oxide. When adding water at a later time, calcium oxide (CaO) reacts to form calcium hydroxide (Ca(OH)$_2$) which in turn acts as an alkali. In this way, the added amount of an alkaline activator, which is necessary for producing geopolymers, can be decreased and the production costs can be reduced.

Due to the comparatively high calorific value, large amounts of heat are released during combustion, which can be utilized for recovering energy. At the same time, the use of the remaining mineral residue (in particular semicoke, a substance which results from the incomplete carbonization of the oil shale and in terms of composition and structure ranges between coal and pitch) as educt for geopolymers represents a reasonable use of this waste product.

To allow replacement of the alkaline activator by potassium hydroxide for the most part, the calcium content in the oil shale is at least 10% in accordance with an embodiment of the invention.

A preferred embodiment of the invention furthermore provides for grinding the oil shale prior to combustion. To be able to ensure a uniform combustion, grinding should be effected to a mean grain size of <10 mm, preferably <5 mm, with a narrow grain range of e.g. ±0.5 mm being preferred.

In accordance with an embodiment of the invention, the combustion is performed at 850 to 1000° C., wherein a particularly favorable temperature range ranges between 900 and 950° C., as from about 900° C. the limestone contained in the oil shale is completely decarbonised.

To avoid undesired side reactions, the raw material is cooled after the combustion in accordance with an embodiment of the invention. Cooling screws or fluidized-bed coolers are particularly useful for this purpose.

Furthermore, beside the actual oil shale calcining residue the addition of further binders is recommendable for producing the geopolymer binder, which can be e.g. fly ashes or calcined clay. The properties of the material, such as the strength, thereby can be influenced once again. The addition of rocks of different grain sizes also is within the scope of an embodiment of the invention.

To achieve a high pH value required in accordance with an embodiment of the invention, and hence the polycondensation of the aluminosilicate polymers, the addition of an alkaline activator furthermore is necessary. Sodium hydroxide solution, potassium hydroxide solution, sodium waterglass (sodium silicate solution) or potassium waterglass (potassium silicate solution) are particularly useful as such alkaline activator, since the same are readily available alkaline additives.

Preferably, hardening of the material then takes place within less than 24 hours, particularly preferably within less than 6 hours.

It was furthermore found to be advantageous to adjust the mol ratio of silicon to aluminum in the geopolymer mixture to 2 to 5, the mol ratio of potassium to aluminum to 0.6 to 0.7, the mol ratio of silicon to potassium to 3 to 10, the mol ratio of calcium to aluminum to 0.1 to 0.4, and the mol ratio of silicon to calcium to 4.9 to 41. This is done by fine adjustment and thus provides a selective control of the application parameters of the geopolymer thus obtained.

An embodiment of the invention also comprises a geopolymer which has been produced by the process of an embodiment of the invention and has the mol ratio of silicon to aluminum of 2 to 5, the mol ratio of potassium to aluminum of 0.6 to 0.7, the mol ratio of silicon to potassium of 3 to 10, the mol ratio of calcium to aluminum of 0.1 to 0.4, and the mol ratio of silicon to calcium of 4.9 to 41.

According to the plant construction shown in FIG. 1, the oil shale first is charged to a grinding mill 1, in which it is comminuted to a grain size of less than 10 mm, e.g. 4-5 mm. Via conduit 2, the oil shale thus ground is delivered into the furnace 3. This furnace is preferably a fluidized-bed furnace, wherein at larger feed rates (>1000 tons per day) the use of a circulating fluidized bed is recommended. At temperatures above 900° C., a complete decarbonisation of the limestone contained in the oil shale takes place.

Via conduit 4, the powder thus burnt is supplied to a cooling stage 5. Cooling screws or fluidized-bed coolers are particularly preferred configurations. The powder cooled down to about 150° C. then is supplied to a further grinding mill 7 via conduit 6. In this grinding mill 7, the powder is ground to a grain size of less than 100 μm, before it then is supplied to the first mixing tank 9 via conduit 8.

Further binders, e.g. fly ashes or calcined clay, can be admixed here via conduit 10, before the mixture is transferred via conduit 11 into the mixing tank 12, into which an activator solution is introduced via conduit 13, which consists of one or more alkaline activator(s), e.g. NaOH, KOH, sodium waterglass (sodium silicate solution) or potassium waterglass (potassium silicate solution). Through conduit 14, the mixture flows into the mixing tank 15, where it is mixed with water from conduit 16, in order to quench the CaO contained in the burnt oil shale residue and achieves the desired workability of the mixture. When adding water, hydrated lime (CaO+H$_2$O→Ca(OH)$_2$) is formed. The geopolymer has the following composition: Mol ratios Si:Al=2 to 5, K:Al=0.6 to 0.7, Si:K=3 to 10, Ca:Al=0.1 to 0.4, Si:Ca=4.9 to 41. In dependence on the raw materials, the exact composition of the geopolymer will be optimized depending on the application. It was noted that an amount of 8% calcium hydroxide in the geopolymer mixture has an advantageous influence on the development of strength.

Instead of an arrangement in three separate mixing tanks it is also conceivable to have all three supply conduits open into a single tank. A reversal of the individual mixing stages is also possible.

Through conduit 17, the geopolymer mixture is delivered into a further tank 18, in which the composition of the mixture is controlled via a measuring device 19. Via conduit 20, missing components can then be supplied. Alternatively, the composition of the geopolymer in accordance with an embodiment of the invention can be achieved by means of a measuring device, which controls the supply of binder, alkaline activator and/or water into the respective mixing tank(s).

Via conduit 21, the mixture is finally delivered to harden in the hardening tank 22, from which the geopolymer or geopolymer concrete component of an embodiment of the invention can be demoulded after a sufficient hardening time.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS 1 grinding mill
2 conduit
3 furnace
4 conduit
5 grinding mill
6 conduit 7 cooling device
8 conduit
9 mixing tank
10 conduit
11 conduit
12 mixing tank
13 conduit
14 conduit
15 mixing tank
16 conduit
17 conduit
18 mixing tank
19 measuring device
20 conduit
21 conduit
22 hardening tank

The invention claimed is:

1. A process for producing a geopolymer, comprising:
combusting at least one of oil shale and mineral residues so as to produce a combustion product, the at least one oil shale and mineral residues originating from a production of oil using the oil shale;
grinding the combustion product;
adding an alkaline activator to the combustion product to form a geopolymer mixture;
adding water to the geopolymer mixture;
adjusting the geopolymer mixture so as to obtain a mol ratio of Si:Al of 2 to 5, a mol ratio of K:Al of 0.6 to 0.7, a mol ratio of Si:K of 3 to 10, a mol ratio of Ca:Al of 0.1 to 0.4, and a mol ratio of Si:CA of 4.9 to 41; and
hardening the geopolymer mixture.

2. The process according to claim 1, wherein the oil shale has a Ca content of at least 10% (w/w).

3. The process according to claim 1, further comprising grinding the oil shale to a mean grain size of <10 mm prior to the combusting.

4. The process according to claim 1, further comprising grinding the oil shale to a mean grain size of <5 mm prior to the combusting.

5. The process according to claim 1, wherein the combusting is performed at 850 to 1000° C.

6. The process according to claim 1, wherein the combusting is performed at 900 to 950° C.

7. The process according to claim 1, further comprising cooling the combustion product after the combusting.

8. The process according to claim 1, wherein the at least one binder is added to the ground combustion products.

9. The process according to claim 8, wherein the at least one binder includes at least one of fly ash and calcined clay.

10. The process according to claim 1, wherein the alkaline activator includes at least one of sodium hydroxide solution, potassium hydroxide solution, sodium waterglass solution and potassium waterglass solution.

11. The process according to claim 1, wherein the hardening is performed in less than 24 hours.

12. The process according to claim 1, wherein the hardening is performed in less than 6 hours.

13. A geopolymer having a mol ratio of Si:Al of 2 to 5, a mol ratio of K:Al of 0.6 to 0.7, a mol ratio of Si:K of 3 to 10, a mol ratio of Ca:Al of 0.1 to 0.4, and a mol ratio of Si:CA of 4.9 to 41, the geopolymer being produced by a process comprising:
combusting at least one of oil shale and mineral residues so as to produce a combustion product, the at least one oil shale and mineral residues originating from a production of oil using the oil shale;
grinding the combustion product;
adding an alkaline activator to the combustion product so as to form a geopolymer mixture;
adding water to the geopolymer mixture; and
hardening the geopolymer mixture.

* * * * *